(12) United States Patent
Sarfare et al.

(10) Patent No.: US 9,280,430 B2
(45) Date of Patent: Mar. 8, 2016

(54) DEFERRED REPLICATION OF RECOVERY INFORMATION AT SITE SWITCHOVER

(71) Applicant: NetApp, Inc., Sunnyvale, CA (US)

(72) Inventors: Parag Sarfare, Sunnyvale, CA (US); Yong Cho, Saratoga, CA (US); Tabriz Holtz, Sunnyvale, CA (US); Anuja Jaiswal, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 107 days.

(21) Appl. No.: 14/276,375

(22) Filed: May 13, 2014

(65) Prior Publication Data

US 2015/0331766 A1 Nov. 19, 2015

(51) Int. Cl.
*G06F 11/00* (2006.01)
*G06F 11/20* (2006.01)
*H04L 29/08* (2006.01)

(52) U.S. Cl.
CPC ........ *G06F 11/2069* (2013.01); *G06F 11/2023* (2013.01); *G06F 11/2053* (2013.01); *G06F 11/2056* (2013.01); *H04L 67/1095* (2013.01)

(58) Field of Classification Search
CPC ............ G06F 11/2023; G06F 11/2069; G06F 11/2053; G06F 11/2056; G06F 11/2058; G06F 11/2064; G06F 11/2076; H04L 67/1095
See application file for complete search history.

(56) References Cited

U.S. PATENT DOCUMENTS

| | | | | |
|---|---|---|---|---|
| 8,327,186 B2* | 12/2012 | Coatney | .............. | G06F 11/2033 714/6.3 |
| 2004/0260899 A1* | 12/2004 | Kern | ................... | G06F 11/2058 711/162 |
| 2005/0071708 A1* | 3/2005 | Bartfai | ................. | G06F 11/2064 714/6.3 |
| 2005/0071710 A1* | 3/2005 | Micka | ................. | G06F 11/2058 714/6.12 |
| 2014/0047263 A1* | 2/2014 | Coatney | .............. | G06F 11/2023 714/4.11 |

* cited by examiner

*Primary Examiner* — Bryce Bonzo
*Assistant Examiner* — Anthony J Amoroso
(74) *Attorney, Agent, or Firm* — Cooper Legal Group, LLC

(57) ABSTRACT

Methods, systems, and computer program products for providing deferred replication of recovery information at site switchover are disclosed. A computer-implemented method may include receiving a first copy of logged data for storage volumes of a disaster recovery (DR) partner at a remote site from the DR partner, receiving a request to perform a site switchover from the remote site to the local site, receiving a second copy of logged data for the storage volumes from a local high availability (HA) partner in response to the switchover, and recovering the storage volumes locally by applying one or more of the copies of logged data to corresponding mirrored storage volumes at the local site.

20 Claims, 4 Drawing Sheets

DEFERRED REPLICATION OF RECOVERY INFORMATION AT SITE SWITCHOVER

TECHNICAL FIELD

Examples of the present disclosure generally relate to high availability computer systems, and more specifically, relate to providing efficient high availability using deferred replication of recovery information.

BACKGROUND

A storage server is a computer system that performs data storage and retrieval for clients over a network. For example, a storage server may carry out read and write operations on behalf of clients while interacting with storage controllers that transparently manage underlying storage resources. Two methods of providing network accessible storage include network-attached storage (NAS) and storage area networks (SANs).

Network-attached storage (NAS) is a file-level storage system that provides clients with data access over a network. In addition, a storage area network (SAN) is a type of specialized high-speed network that interconnects clients with shared storage resources. Either type of distributed storage system may include storage controllers that implement low-level control over a group of storage drives to provide virtualized storage.

Storage nodes may be clustered together to provide high-availability data access. For example, two storage nodes may be configured so that when one node fails, the other node continues processing without interruption. In addition, another set of clustered storage nodes may exist in a different location for disaster recovery purposes. To provide such resiliency, the various storage nodes regularly exchange their logged information with one another. However, sharing the logged information uses network bandwidth, and the use of network bandwidth may be higher than an acceptable amount if the logged information is shared among a large number of nodes.

BRIEF DESCRIPTION OF THE DRAWINGS

The present disclosure is illustrated by way of example, and not by way of limitation, and can be understood more fully from the detailed description given below and from the accompanying drawings of various examples provided herein. In the drawings, like reference numbers may indicate identical or functionally similar elements. The drawing in which an element first appears is generally indicated by the left-most digit in the corresponding reference number.

DETAILED DESCRIPTION

Figure 1:
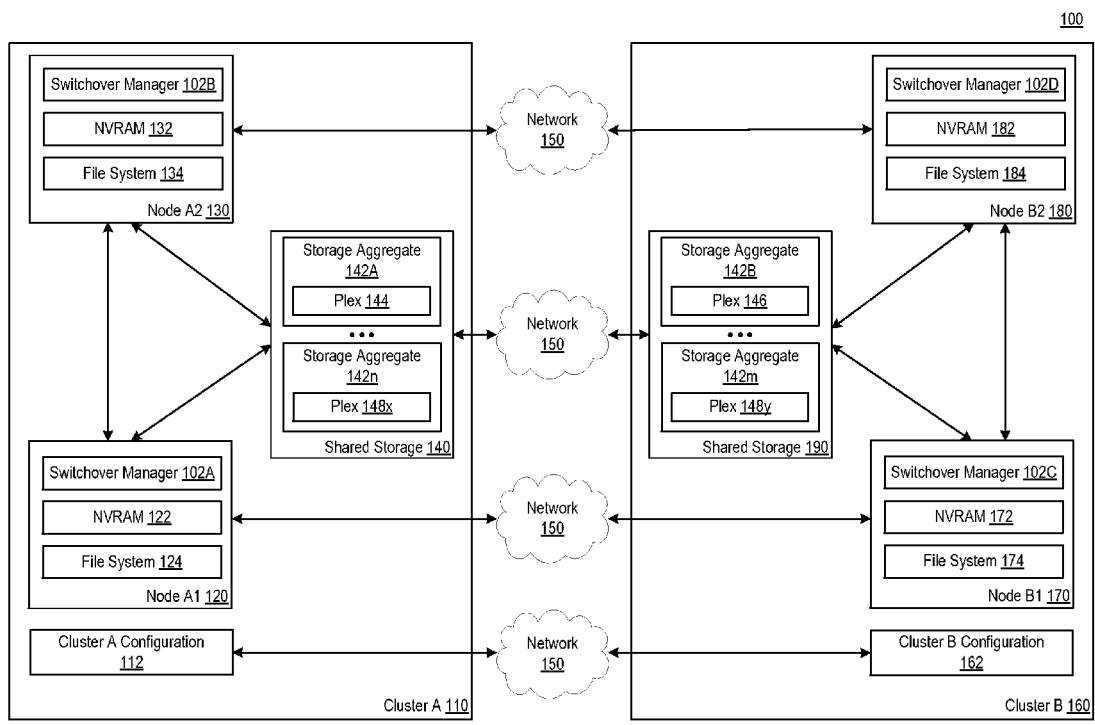
FIG. 1 illustrates an example system architecture for providing deferred replication of recovery information at site switchover, in accordance with various examples of the present disclosure.

Disclosed herein are systems, methods, and computer program products for providing high availability using deferred replication of recovery information at site switchover.

In an example, two high-availability (HA) storage clusters are configured as disaster recovery (DR) partners at different sites connected via a high-speed network. Each cluster processes its own client requests independently and can assume operations of its DR partner when an outage occurs. Transactions performed on each cluster are replicated to the other respective cluster, thus allowing seamless failover during a site outage.

In an example, a node in a high availability (HA) cluster at one site periodically receives recovery data from its disaster recovery (DR) partner node in different HA cluster at a another site. The recovery data allows the node to recover storage volumes of its DR partner locally, for example, when a disaster occurs at the other site.

In an example, the disaster recovery (DR) partner at the other site fails and its local high availability (HA) partner takes over its volume processing at the other site. However, the HA partner of the failed DR partner does not send recovery data to the original node, but instead sends it to a different node (e.g., its own DR partner). Thus, the original node no longer has access to recovery data that it can use to recover storage volumes of its failed DR partner.

In an example, replication of recovery data to the original node is deferred until site switchover. For example, at the time of switchover, the recovery data may be provided by a node that received the recovery data from a high availability (HA) partner of the failed DR partner. In one example, the recovery data is provided by a local HA partner of the original node as part of a switchover operation. The original node then may use the data to recover volumes of its failed DR partner on the local cluster as part of the switchover.

Various illustrations of the present disclosure will be understood more fully from the detailed description given below and from the accompanying drawings of various examples described herein. In the drawings, like reference numbers may indicate identical or functionally similar elements. The drawing in which an element first appears is generally indicated by the left-most digit in the corresponding reference number.

FIG. 1 illustrates an example system architecture for providing deferred replication of recovery information at site switchover, in accordance with various examples of the present disclosure. System architecture 100 includes cluster A 110, cluster B 160, and network 150.

Any component or combination of components in cluster A 110 or cluster B 160 may be part of or may be implemented with a computing device. Examples of computing devices include, but are not limited to, a computer, workstation, distributed computing system, computer cluster, embedded system, stand-alone electronic device, networked storage device (e.g., a storage server), mobile device (e.g. mobile phone, smart phone, navigation device, tablet or mobile computing device), rack server, storage controller, set-top box, or other type of computer system having at least one processor and memory. Such a computing device may include software, firmware, hardware, or a combination thereof. Software may include one or more applications and an operating system. Hardware may include, but is not limited to, one or more processors, types of memory and user interface displays.

A storage controller is a specialized computing device that provides clients with access to storage resources. A storage controller usually presents clients with logical volumes that appear as a single unit of storage (e.g., a storage drive, such as a solid-state drive (SSD) or a disk). However, logical volumes may be comprised of one or more physical storage drives. For example, a single logical volume may be an aggregation of multiple physical storage drives configured as a redundant array of independent disks (RAID). RAID generally refers to storage technology that combines multiple physical storage drives into a single logical unit, for example, to provide data protection and to increase performance. In an example, a storage server may operate as part of or on behalf of network attached storage (NAS), a storage area network (SAN), or a file server by interfacing with one or more storage controllers on behalf of one or more clients. Further, a storage server also may be referred to as a file server or storage appliance.

Cluster A 110 includes cluster A configuration 112, node A1 120, node A2 130, and shared storage 140. Cluster B 160 includes cluster B configuration 162, node B1 170, node B2 180, and shared storage 190. A cluster generally describes a set of computing devices that work together for a common purpose while appearing to operate as a single computer system. Clustered computing devices usually are connected via high-speed network technology, such as a fast local area network (LAN) or fibre channel connectivity. Clustering generally may be used, for example, to provide high-performance and high availability computing solutions.

In an example, cluster A 110 is a high availability (HA) cluster at one geographic location or "site" that uses node A1 120 and node A2 130 as a high availability (HA) pair of computing devices to provide access to computer systems, platforms, applications and/or services with minimal or no disruption. Similarly, cluster B 160 also is a high availability (HA) cluster at a different geographic location or "site" than cluster A 110, which uses node B1 170 and node B2 180 as a high availability (HA) pair to provide access to computer systems, platforms, applications and/or services at a different location with minimal or no disruption.

In an example, cluster A 110 and cluster B 160 each may provide users with physical and/or virtualized access to one or more computing environments, networked storage, database servers, web servers, application servers, software applications or computer programs of any type, including system processes, desktop applications, web applications, applications run in a web browser, web services, etc.

While cluster A 110 and cluster B 160 each provide high availability (HA) services for a site, each cluster itself is susceptible to disruptive events that can occur at a particular location. For example, an entire site may become unavailable for one or more various reasons, including an earthquake, a hurricane, a flood, a tornado, a fire, an extended power outage, a widespread network outage, etc. In addition, a site may need to be shutdown periodically for maintenance or other purposes, such as relocation.

To provide additional redundancy and increased resiliency against natural disasters and other events that may impact site availability, cluster A 110 and cluster B 160 may be configured as disaster recovery (DR) partners. In an example, cluster B 160 serves as a disaster recovery (DR) partner for cluster A 110 (and vice versa). For example, cluster A 110 may be located at a first site (e.g., San Francisco) and cluster B 160 may be located at a second site 50-100 miles away (e.g., San Jose). Transactions occurring on each node of cluster A 110 are replicated or copied over network 150 to a corresponding disaster recovery partner node on cluster B 160 and then replayed to keep the two clusters synchronized. Thus, when a site outage occurs or cluster A 110 is unavailable for some reason, cluster B 160 may take over operations for cluster A 110 via an automated or manual switchover.

In an example, multiple sites may serve as disaster recovery partner sites for cluster A 110. For example, disaster recovery partner nodes in cluster B 160, cluster C (not shown) in a third location (e.g., Oakland), or any number of additional clusters may receive replicated transactions from nodes on cluster A 110. In addition, the disaster recovery partner nodes in the other clusters each may participate in a high-availability relationship with one or more nodes at their respective site.

In an example, one or more sites are selected for switchover from multiple available disaster recovery partner sites based on at least one of current or recent site processing, current or recent site resource availability, or anticipated site resource availability for each site. In one example, operations from cluster A 110 may be distributed (e.g., balanced) across multiple disaster recovery partners as part of a switchover. For example, processing associated with some nodes of cluster A 110 may be transferred to cluster B 160 while processing of other cluster A 110 nodes may be transferred to cluster C (not shown) and/or other clusters (not shown).

A switchover generally refers to switching or transferring processing from one computing resource (e.g., a computer system, cluster, network device, etc.), to another redundant or backup computing resource. The terms "switchover" and "switchover operation" generally refer to manual, semi-automated, or automated switchover processing. In an example, forms of automated and semi-automated switchover sometimes may be referred to as "failover."

In the example described above, cluster B 160 serves as a disaster recovery (DR) partner for cluster A 110. Similarly, cluster A 110 also may serve as a disaster recovery (DR) partner for cluster B 110. In one example, cluster A 110 and cluster B 160 each may receive and process their own user requests. Transactions occurring at each respective site may be replicated or copied to the other disaster recovery (DR) partner, and the disaster recovery (DR) partner may assume or takeover operations when switchover occurs.

In an example, transactions from a node of one cluster are replicated or copied across a network 150 to a disaster recovery (DR) partner node on a cluster at a different location. Network 150 may generally refer to a public network (e.g., the Internet), a private network (e.g., a local area network (LAN), a metropolitan area network (MAN), a wide area network (WAN)), fibre channel communication, an inter-switch link, or any combination thereof. In an example, network 150 is a redundant high-speed interconnect between cluster A 110 and cluster B 160.

In an example, configuration information is synchronized with a disaster recovery (DR) partner to ensure operational consistency in the event of a switchover. For example, cluster configuration data may be indicated by an administrator upon configuration and then periodically updated. Such data may be stored as metadata in a repository that is local to a cluster. However, to provide consistent and uninterrupted operation upon switchover to a DR partner cluster at a different site, configuration information should be synchronized between the clusters.

In an example, cluster A configuration 112 data is synchronized with cluster B configuration 162 data when cluster A 110 and cluster B 160 are disaster recovery (DR) partners. For example, cluster A configuration 112 data and associated updates may be replicated or copied to cluster B configuration 162 (and vice versa) so that cluster A configuration 112 data and cluster B configuration data 162 are identical and either cluster may assume operations of the other without complication or interruption upon switchover.

In an example, node A1 120 and node A2 130 are computing devices configured as a high availability (HA) pair in cluster A 110. Similarly, node B1 170 and node B2 180 also are configured as a high availability (HA) pair in cluster B 160. Each of node A1 120, node A2 130, node B1 170 and node B2 180 may include specialized computing devices, such as storage controllers or computing devices that interact with one or more storage controllers.

A high availability (HA) pair generally describes two nodes that are configured to provide redundancy and fault tolerance by taking over operations and/or resources of a HA partner to provide uninterrupted service when the HA partner becomes unavailable. In an example, a HA pair may be two storage systems that share multiple controllers and storage. The controllers may be connected to each other via a HA interconnect that allows one node to serve data residing on storage volumes of a failed HA partner node. Each node may continually monitor its partner and mirror non-volatile memory (NVRAM) of its partner. The term "takeover" may be used to describe the process where a node assumes operations and/or storage of a HA partner. Further, the term "giveback" may be used to describe the process where operations and/or storage is returned to the HA partner.

Each node in cluster A 110 and cluster B 160 includes its own local copy of non-volatile random-access memory (NVRAM). For example, node A1 120 includes NVRAM 122, node A2 130 includes NVRAM 132, node B1 170 includes NVRAM 172, and node B2 180 includes NVRAM 182. Non-volatile memory generally refers to computer memory that retains stored information even when a computer system is powered off.

One type of NVRAM is static random access memory (SRAM), which is made non-volatile by connecting it to a constant power source, such as a battery. Another type of NVRAM uses electrically erasable programmable read-only memory (EEPROM) chips to save contents when power is off. EEPROM memory retains contents even when powered off and can be erased with electrical charge exposure. Other NVRAM types and configurations exist and can be used in addition to or in place of the previous illustrative examples.

In an example, when a client performs a write operation, a responding node (e.g., node A1 120) first writes the data to its local NVRAM (e.g., NVRAM 122) instead of writing the data directly to a storage volume. A node first may write data to local NVRAM and then periodically flush its local NVRAM to storage volume to provide faster performance. NVRAM protects the buffered data in the event of a system crash because NVRAM will continue to store the data even when a node is powered off.

To further protect against potential data loss, local NVRAM also may be mirrored on a HA partner. For example, contents of NVRAM 132 of node A2 130 are replicated or copied to NVRAM 122 of node A1 120 on cluster A 110. Thus, if node A2 130 were to fail, a copy of NVRAM 132 exists in NVRAM 122 and may be replayed (e.g., extracted and written to storage volume) by node A1 120 to prevent data loss.

Similarly, local NVRAM also may be mirrored on a node of another cluster at a different site, such as a disaster recovery (DR) partner, to provide two-way NVRAM mirroring. For example, NVRAM 132 of node A2 130 may be mirrored replicated or copied to both NVRAM 122 of node A1 120 and also to NVRAM 182 of node B2 180 on cluster B 160. In an example, Cluster A 110 may fail and an administrator may perform a switchover to cluster B 160. Since node B2 180 has a copy of NVRAM 132 from node A2 130 in NVRAM 182, the replicated data from NVRAM 132 can be replayed (e.g., extracted and written to a storage volume) as part of the switchover operation to avoid data loss.

In an example, each node participates in a NVRAM mirroring relationship with two other nodes in a four-node high-availability (HA) and disaster recovery (DR) configuration. For example, each node may send a copy of its local logged data in NVRAM to both a HA partner node on the same cluster and to a corresponding DR partner node on a different cluster. Thus, each node sends a copy of its locally-logged data to a HA partner to allow failover on the same cluster and another copy of the locally-logged data to a DR partner across a network 150 to allow site switchover. In some examples, additional nodes may participate in a mirroring configuration at one site and across different sites.

In an example, NVRAM on each node is divided into a plurality of partitions to facilitate NVRAM mirroring with both a high-availability (HA) partner node and a disaster recovery (DR) partner node. In one example, NVRAM on each node includes at least three NVRAM partitions. For example, a first NVRAM partition may be used to store logged transaction data (e.g., updates) that occurred on the local node. A second NVRAM partition may be used to store a copy of logged transaction data received from a HA partner node comprising updates that occurred on the HA partner. A third NVRAM partition may be used to store a copy of logged transaction data received from a DR partner node comprising updates that occurred on the DR partner. In one example, NVRAM on each node includes one or more additional partitions, such as an auxiliary partition that may be used as temporary space, an overflow area, or a working area used when performing recovery of a node at one site or across different sites.

In cluster A 110, both node A1 120 and node A2 130 access shared storage 140. Shared storage 140 of cluster A 110 includes storage aggregates 142A . . . 142n. Similarly, both node B1 170 and node B2 180 access shared storage 190 of cluster B 160. Shared storage 190 of cluster B 160 includes storage aggregates 142B . . . 142m. In one example, shared storage 140 and shared storage 190 may be part of the same storage fabric, providing uninterrupted data access across different sites via high speed metropolitan and/or wide area networks.

Storage aggregate 142A includes plex 144, and storage aggregate 142B includes plex 146. A plex generally describes storage resources used to maintain a copy of mirrored data. In one example, a plex is a copy of a file system. Further, plexes of a storage aggregate may be synchronized, for example, by using simultaneous updates or replication so that the plexes are maintained as identical.

Storage aggregates 142n and 142m generally represent that a plurality of storage aggregates may exist across different sites. For example, each general storage aggregate may be comprised of multiple, synchronized plexes (e.g., an instance of plex 148x and an instance of plex 148y) in different locations.

In an example, some storage aggregates are owned by a node in one location (e.g., cluster A 110), while other storage aggregates are owned by another node in a different location (e.g., cluster B 160). In one example, a node in cluster A 110 (e.g., node A1 120) owns a storage aggregate (e.g., storage aggregate 142A, 142B). The storage aggregate includes a plex 144 in cluster A 110 and a plex 146 in cluster B 160, which also are owned by node A1 120. In one example, node A1 120 writes to the plexes, which may not be accessed by disaster recover partner node B1 170 until ownership of the storage aggregate and plexes are changed, for example, as part of a switchover.

As an example, plex locality is generally descriptive and usually based on a plex's location relative to a controlling node (e.g., a node that owns the storage aggregate associated with the plex). For example, a plex associated with cluster A 110 would be local to a controlling node in cluster A 110 while a plex in cluster B 160 would be remote to the controlling node in cluster A 110. Similarly, plex locality described in the previous example would be reversed when the controlling node is located in cluster B 160.

In an example, storage aggregate 142A and storage aggregate 142B each are part of a single storage aggregate spanning across sites (e.g., cluster A 110 and cluster B 160). In one example, a storage aggregate is created as a synchronized RAID mirror. A synchronized RAID mirror generally refers to a configuration where different copies of mirrored data are kept in sync, for example, at a single location or across different sites (i.e., geographic locations). In addition, RAID (redundant array of independent disks) generally refers to storage technology that combines multiple storage drives into a logical unit for data protection and faster performance.

In an example, storage aggregate 142A and storage aggregate 142B belong to the same storage aggregate owned by a single node. In one example, node A2 130 owns storage aggregates 142A and 142B and writes data to plex 144. The data updates then are replicated to cluster B 160 and applied to plex 146 to keep plex 144 and plex 146 synchronized. Thus, when a switchover occurs, a disaster recover (DR) partner has a mirrored copy of the other site's data and may take over and resume operations of the other site with little or no disruption.

In an example, node A1 120, node A2 130, node B1 170 and node B2 180 each include a respective switchover manager (e.g., switchover manager 102A-102D). Switchover manager 102A-102D is computer software that manages switchover operations between cluster A 110 and cluster B 160. In an example, switchover manager 102A-102D may be part of an operating system (OS) running on a node, may include one or more extensions that supplement core OS functionality, and also may include one or more applications that run on an OS. In one example, switchover manager 102A-102D is provided as part of a storage operating system that runs on a node.

In an example, node A1 120, node A2 130, node B1 170 and node B2 180 each include a respective file system (file system 124, file system 134, file system 174 and file system 184). A file system generally describes computer software that manages organization, storage and retrieval of data. A file system also generally supports one or more protocols that provide client access to data. In some examples, a write-anywhere file system, such as the Write Anywhere File Layout (WAFL®) may be used. In an example, various switchover manager operations may be implemented independent of a file system, as part of a file system, or in conjunction with a file system. In one example, a switchover manager uses file system information and features (e.g., file system attributes and functionality) when performing a switchover. In an example, a file system such as WAFL® may be used to create, format, maintain, manage, copy and perform various operations on logical volumes that are allocated and provided from one or more physical storage resources.

In an example, an administrator invokes switchover functionality by issuing a switchover command using a command line or graphical user interface (GUI). For example, an administrator may issue a switchover command either prior to or after an outage occurs on a cluster at a specific site to transfer operations from the cluster to another cluster at a different site. In some examples, site switchover may occur in response to an outage or other condition detected by a monitoring process. For example, a monitoring process running at a disaster recovery site or another non-local site may trigger a switchover when site availability is disrupted or site performance is inadequate.

In an example, a planned or unplanned outage may occur at the site of cluster A 110. A system administrator ("administrator") issues a switchover command from a node on cluster B 160 to invoke switchover manager functionality that transfers operations from cluster A 110 to cluster B 160. For example, the administrator may issue the switchover command either from node B1 170 to invoke switchover manager 102C or from node B2 180 to invoke switchover manager 102D, regardless of which node is configured as the master node for cluster B 160.

In an example, a switchover manager on cluster B 160 (e.g., switchover manager 102C or switchover manager 102D) performs a switchover from cluster A 110 to cluster B 160 by changing ownership of one or more storage aggregates and corresponding volumes (e.g., synchronized RAID mirror volumes) in shared storage 190 from a node on cluster A 110 to a node on cluster B 160 (e.g., node B1 170 or node B2 180). After storage aggregate and volume ownership changes, then the transitioned volumes are initialized when brought online with the cluster B 160 node as the owner. Further, any buffered data previously replicated from non-volatile random access memory (NVRAM) on cluster A 110 (e.g., NVRAM 122 or NVRAM 132) to NVRAM on cluster B 160 (e.g., NVRAM 172 or NVRAM 182) is replayed on volumes of storage aggregate 142B.

In an example, when replicated buffered data mirrored from cluster A 110 is replayed and written to the volumes, then the switchover to cluster B 160 is complete. Further, the switchover from cluster A 110 to cluster B 160 may be transparent to clients, and cluster B 160 may provide the same services as cluster A 110 with little or no interruption. In one example, operations that have been switched over to cluster B 160 may be switched back to cluster A 110, for example at a later time, after a full recovery of site A 110 (and vice versa).

In an example, node failure results in the transfer of processing from a failed node to a high availability (HA) partner of the failed node at the same site. In one example, node A2 130 fails, and node A1 120 takes over processing as the HA partner. As part of the takeover, node A1 120 may update volumes owned by node A2 130 using a copy of logged transaction data received from node A2 130 prior to the failure.

In an example, each node has non-volatile random access memory (NVRAM) with four partitions. In one example, node A1 120 uses a first NVRAM partition to store a copy of its own logged transaction data before writing such data to storage volume. Node A1 120 uses a second NVRAM partition to store a copy of logged transaction data for transactions that occurred on its high-availability (HA) partner (i.e., node A2 130). Node A1 120 uses a third NVRAM partition to store a copy of logged transaction data for transactions that occurred on its disaster recovery (DR) partner (i.e., node B1 170). Node A1 120 also may have a fourth NVRAM partition that is used for temporary, working, and overflow storage of logged transaction data or other types of data. In some examples, NVRAM partitions may be of a uniform size or of different sizes. In addition, NVRAM partitions may be provided in any order.

In an example, node A1 120 stores a copy of node A2 130 transaction log data received before failure of node A2 130. In one example, node A1 120 uses the copy of the transaction log data (e.g., in its local, HA partner NVRAM partition) to update volumes of node A2 130 prior to taking ownership of the volumes during failover. In some examples, node A1 120 first takes ownership of node A2 130 volumes before writing logged transaction data to the volumes.

In an example, node A1 120 uses its high availability (HA) partner NVRAM partition for another purpose after taking over processing for node A2 130. In one example, node A1 120 uses its HA partner NVRAM partition to store logged transaction data associated with processing on node A1 120 without modifying the partition. In one example, node A1 120 merges its HA partner NVRAM partition with another partition and uses the merged partition space to log local node A1 120 transaction data.

In an example, node A1 120 owns and updates node A2 130 volumes in shared storage 140 after failure of node A2 130. For example, when node A1 120 takes ownership of the volumes, it writes logged transaction data associated with the volumes to its NVRAM 122 and sends a copy of the logged transaction data to its disaster recovery (DR) partner (i.e., node B1 170). However, since node A2 130 is inactive, its DR partner node B2 180 stops receiving copies of the logged transaction data that it would use to recover node A2 130 volumes in the event of a switchover.

In an example, volume processing is transferred to a high-availability (HA) partner of a failed node at one site. The HA partner takes over volumes of the failed node and replicates corresponding logged transaction data to its own disaster recovery (DR) partner (not the original DR partner of the failed node) at another site. The HA partner continues sending its logged transaction data to its own DR partner and does not send a copy of its processing to the original DR partner of the failed node to maintain a mirroring relationship, to conserve network 150 bandwidth, and to reduce network 150 operation costs. Thus, the original DR partner of the failed node does not have logged transaction data (i.e., recovery data) generated by the HA partner of the failed node that would be evaluated and possibly used to recover volumes of the failed node as part of a switchover.

In an example, node A1 120 takes over processing of node A2 130 storage volumes when node A2 130 fails. Node A1 120 logs its transaction processing data in a NVRAM 122 partition and sends a copy of the data to its disaster recovery partner, node B1 170. Node B1 170 stores the received transaction processing data of node A1 120 in a disaster recovery partner partition of NVRAM 172. However, node A1 120 does not send a copy of the local transaction data to node B2 180. Instead, copying of such data is deferred until a site switchover occurs to conserve network 150 bandwidth and to reduce associated costs.

Continuing with the example, node B1 170 sends transaction processing data of node A1 120 stored in NVRAM 172 to node B2 180 in response to a switchover. For example, node B2 180 may receive and store the transaction processing data of node A1 120 in an auxiliary, temporary, or working area partition of NVRAM 182. Node B2 180 then may use the data in the NVRAM 182 partition to recover the storage volumes of failed node A2 130 on cluster B 160.

In an example, deferred replication is used to provide a disaster recovery (DR) partner of a failed node with recovery data for volumes originally associated with the failed node at the time of a site switchover. For example, in deferred replication, the DR partner of the failed node receives a copy of logged transaction data generated by a high-availability (HA) partner of the failed node, one time, as part of a switchover. However, the DR partner of the failed node receives the generated data from its own HA partner at the same site, which itself received the generated data from the HA partner of the failed node prior to the switchover. Thus, replication of the logged transaction data may be deferred until a site switchover is requested, for example, when the DR partner of the failed node is to recover the volumes of its failed DR partner at the DR site.

In an example, deferred replication also may be performed when nodes A1 120 and A2 130 are available to process requests, and is not limited to scenarios where one node takes over operations for another failed node. In one example, ownership of a storage aggregate (e.g., storage aggregate 142n) is transferred from node A1 120 to node A2 130 for load balancing or when node A2 130 has been brought online, for example, initially or after recovery.

In the current example, some recovery information for storage volumes of the storage aggregate is generated by node A1 120 prior to the ownership transfer while additional recovery information is generated by node A2 130 after the ownership transfer. The recovery information generated by node A1 120 prior to the ownership transfer is replicated to its disaster recovery partner node B1 170. Similarly, the additional recovery information generated by node A2 130 after the ownership transfer is replicated to its disaster recovery partner node B2 180. Node B1 170 may persist the recovery information it receives for the transferred volumes for some time. Further, replication of this recovery information on node B1 170 may be deferred until the information becomes useful on another node.

For example, the recovery information for the transferred volumes may be copied from node B1 170 to node B2 180 in response to a switchover where node A2 130 processing is being transferred to node B2 180 so that node B2 180 may use the information to perform the switchover and any associated recovery. Thus, node B2 180 may receive, analyze, and use initial recovery information generated by node A1 120 from its high availability partner node B1 170 and also subsequent recovery information generated by its disaster recovery partner (i.e., node A2 130) when taking over processing of volumes owned by node A2 130 as part of a switchover.

In an example, deferred replication of recovery information may be used to improve performance, reduce operational costs, and increase flexibility of multi-site disaster recovery operations. For example, recovery information may be directed and copied to a single node or specific nodes at each site. Further, deferred replication may be used to recover storage volumes of a node on any other node at a different site by replicating corresponding recovery information to the recovery node as part of the switchover.

In an example, similar benefits also can be achieved within a single cluster with multiple nodes configured in a high availability (HA) relationship. In one example, four nodes (e.g., node 1, node 2, node 3 and node 4) in a cluster at a site are configured in a high availability relationship. For example, node 1 may be in a high availability relationship with nodes 2, 3 and 4 where node 1 transactions are mirrored on both node 2 and node 3, and node 1 is configured to failover to node 4. Thus, when node 1 fails, recovery data may be copied from either node 2 or node 3 to node 4 as part of failover to allow node 4 to takeover processing of node 1.

Figure 2:
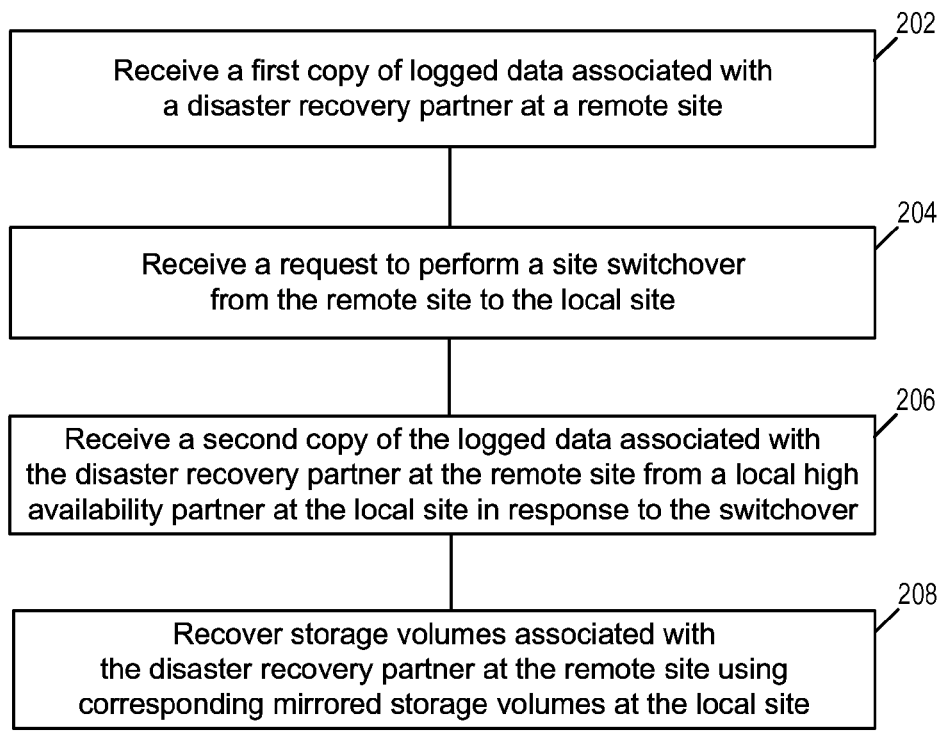
FIG. 2 is a flow diagram illustrating an example of a method for providing deferred replication of recovery information at site switchover.

FIG. 2 is a flow diagram illustrating an example of a method for providing deferred replication of recovery information at site switchover. The method 200 may be performed by processing logic that may comprise hardware (circuitry, dedicated logic, programmable logic, microcode, etc.), software (such as instructions run on a general purpose computer system, a dedicated machine, or processing device), firmware, or a combination thereof. In an example, the method 200 is performed by a switchover manager of a computer system or storage controller (e.g., one or more of switchover manager 102A-102D of FIG. 1).

Method 200 begins at block 202 when a switchover manager receives a first copy of logged data associated with a disaster recovery (DR) partner at a remote site. In an example, switchover manager 102D receives a copy of logged transaction data for processing performed by node A2 130 from switchover manager 102B. In one example, switchover manager 102B stores the logged transaction data in a partition of NVRAM 132 reserved for updates occurring on node A2 130 before sending the logged transaction data to switchover manager 102B (and eventually writing the updates to shared storage 140). Switchover manager 102D may store the logged transaction data it receives from switchover manager 102B in a partition of NVRAM 182 reserved for copies of logged transaction data received from its DR partner (i.e., node A2 130). Switchover manager 102D then may use the logged transaction data to perform recovery of node A2 130 volumes on cluster B 160 during a switchover.

In an example, node A2 130 fails and its high-availability (HA) partner, node A1 120, takes over processing of node A2 130 volumes in shared storage. For example, node A1 120 may write updates stored in a partition of NVRAM 122 reserved for copies of logged transaction data received from its HA partner (i.e., node A2 130). Node A1 120 then may take ownership of node A2 130 volumes and continue processing on behalf of the failed node.

In an example, switchover manager 102A sends logged transaction data comprising updates performed on volumes of node A1 120 to switchover manager 102C of its disaster recovery partner node B1 170. For example, logged transaction data may include a combination of updates that node A1 120 has performed on its own volumes and volumes that it has taken over for failed node A2 130. In one example, switchover manager 102D does not receive logged transaction data from switchover manager 102A in a mirroring configuration between high availability partners and disaster recovery partners. Thus, switchover manager 102D does not receive logged transaction data for node A2 130 volumes after node A2 130 fails and node A1 120 takes over processing on the volumes.

At block 204, a switchover manager receives a request to perform a site switchover from the remote site to the local site. In an example, an administrator issues a switchover command using a command line or graphical user interface (GUI) associated with a node of cluster B 160. For example, an administrator may issue a switchover command either prior to or after an outage occurs on a cluster at a specific site to transfer operations from cluster A 110 to cluster B 160. In one example, an administrator may initiate a switchover using any node of cluster B 160, regardless of which node serves as the cluster's master node.

At block 206, a switchover manager receives a second copy of logged data associated with the disaster recovery partner at the remote site from its high availability partner at the local site in response to the switchover. In an example, switchover manager 102C receives a copy of logged transaction data from switchover manager 102A for processing performed by node A1 120 after failure of node A2 130. Logged transaction data may include updates to node A1 120 volumes and also to node A2 130 volumes that node A1 120 has taken over in response to the failure of its high-availability (HA) partner.

In an example, switchover manager 102D of node B2 180 stops receiving logged transaction data updates from switchover manager 102B when node A2 130 fails. Thus, switchover manager of node B2 180 lacks information to evaluate recovery options and to perform recovery of node A2 130 volumes as part of a switchover between cluster a 110 in cluster B 160.

In an example, switchover manager 102C has a copy of logged transaction data from node A1 120 stored in a partition of its NVRAM 172 that is reserved for disaster recovery. In one example, the logged transaction data from node A1 120 was provided by switchover manager 102A after node A1 120 taking over operations for node A2 130 due to failure. Further, the logged transaction data from node A1 120 stored in NVRAM 172 include updates to both node A1 120 volumes and node A2 130 volumes taken over by node A1 120.

In an example, switchover manager 102C sends the logged transaction data from node A1 120 to switchover manager 102D in response to a switchover to allow node B2 180 to recover the volumes of failed node A2 130 as part of the switchover. In one example, switchover manager 102D receives the node A1 120 logged transaction data from switchover manager 102C and stores the data in an auxiliary, temporary, or working partition of its NVRAM 182 before recovering the volumes of node A2 130 on cluster B 160.

At block 208, a switchover manager recovers storage volumes associated with the disaster recovery partner at the remote site using corresponding mirrored storage volumes at the local site. In an example, switchover manager 102D uses shared storage 190 of cluster B 160 that is mirrored with shared storage 140 of cluster A 110 to recover volumes of node A2 130 on cluster B 160 as part of a switchover. In one example, switchover manager 102D identifies volumes associated with node A2 130 by examining one or more of cluster B 160 metadata, node B2 180 metadata, shared storage 190 metadata, and logged transaction data received from switchover manager 102B of node A2 130.

In an example, switchover manager 102D examines consistency point information of logged transaction data it has received as part of the recovery process. Consistency point information may include a timestamp or a sequential ordering identifier of an update or grouping of updates. In one example, switchover manager 102D compares consistency point information of one or more volumes in shared storage 190 to consistency point information of logged transaction data to determine whether to apply the logged transaction data to the volumes as part of recovery. For example, when a shared storage 190 consistency point is later than the consistency point of logged transaction data, then logged transaction data precedes the current state of shared storage 190 and is not applied. However, when consistency point information of logged transaction data is later than consistency point information of shared storage 190, then switchover manager 102D may apply the logged transaction data to shared storage 190 volumes as part of the recovery.

In an example, switchover manager 102D has a first copy of logged transaction data from node A2 130 in a partition of its NVRAM 182 reserved for disaster recovery (DR) partner recovery data. Switchover manager 102D also has a second copy of logged transaction data associated with volumes of node A2 130 in an auxiliary, temporary or working partition of its NVRAM 182. In one example, switchover manager 102D the determines an ordering of the different copies of logged transaction data. For example, switchover manager 102D may examine consistency point information of each copy of logged transaction data to determine which should be applied first and second. In one example, switchover manager 102D also validates each copy of the logged transaction data corruption or unrecoverable errors that may exist.

In an example, switchover manager 102D applies each copy of the logged transaction data to shared storage 190 in a determined order as part of the recovery. In one example, switchover manager 102D applies a first ordered copy of the logged transaction data to shared storage 190 to perform partial recovery when corruption or another unrecoverable error is detected in the second ordered copy of the logged transaction data. In another example, switchover manager 102D applies the second ordered copy of the logged transaction data to shared storage 190 without applying the first ordered copy when consistency point information of the first ordered copy precedes consistency point information of shared storage 190. In a further example, switchover manager 102D updates shared storage 190 volumes with a failed, unrecoverable, or other similar status when it is unable to perform recovery of node A2 130 volumes on cluster B 160.

Figure 3:
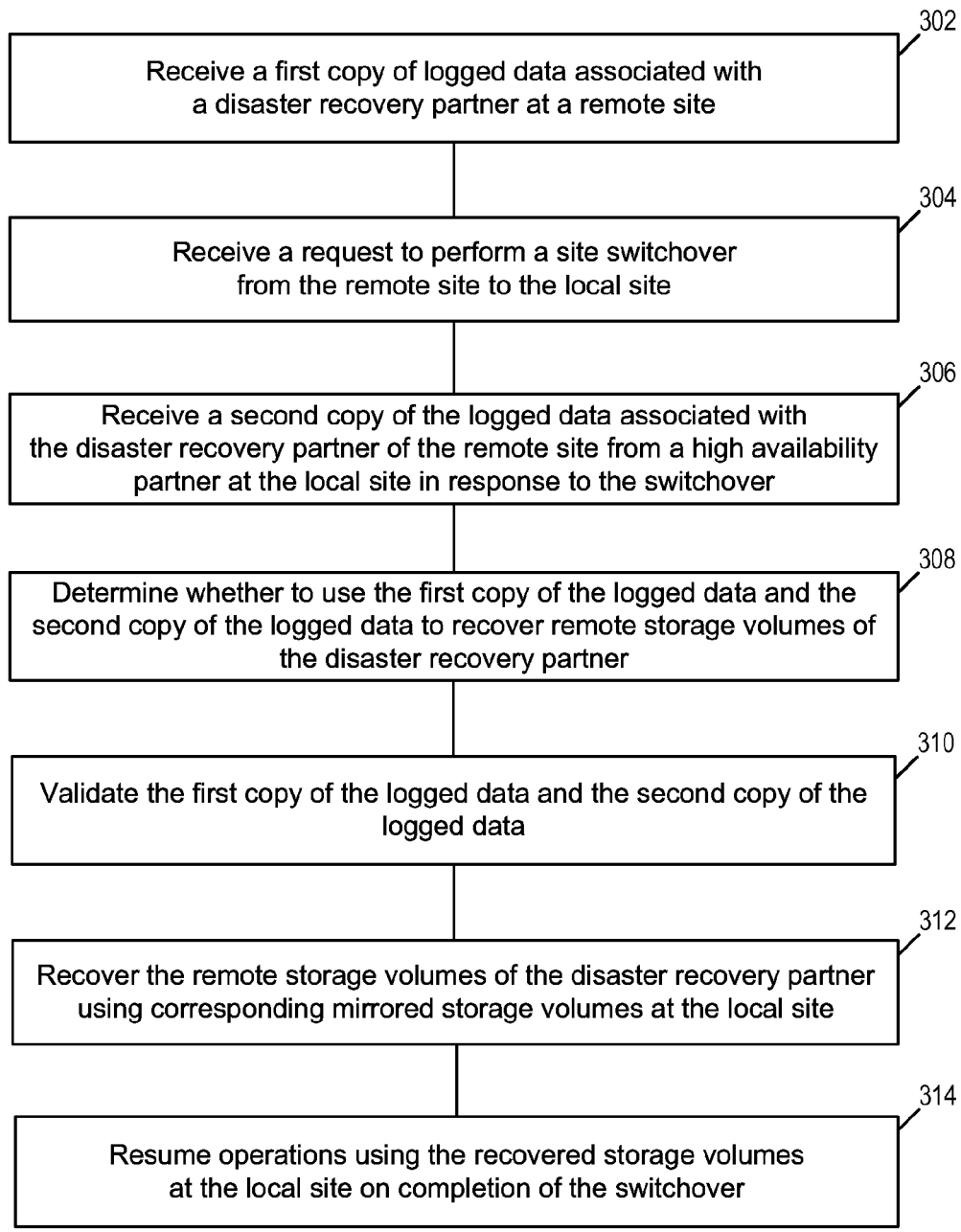
FIG. 3 is a flow diagram illustrating an example of a method for providing deferred replication of recovery information at site switchover with validation.

FIG. 3 is a flow diagram illustrating an example of a method for providing deferred replication of recovery information at site switchover with validation. The method 300 may be performed by processing logic that may comprise hardware (circuitry, dedicated logic, programmable logic, microcode, etc.), software (such as instructions run on a general purpose computer system, a dedicated machine, or processing device), firmware, or a combination thereof. In an example, the method 300 is performed by a switchover manager of a computer system or storage controller (e.g., one or more of switchover manager 102A-102D of FIG. 1).

Method 300 begins at block 302 when a switchover manager receives a first copy of logged data associated with a disaster recovery (DR) partner at a remote site. In an example, switchover manager 102D receives a copy of logged transaction data from switchover manager 102B when node A2 130 and node B2 180 are DR partners in a mirroring configuration. In one example, switchover manager 102B stores the logged transaction data in a partition of NVRAM 132 reserved for local updates before performing another activity involving the data. In addition, switchover manager 102D stores the logged transaction data it receives from switchover manager 102B in a partition of NVRAM 182 reserved for DR partner logged transaction data. Switchover manager 102D then may use the logged transaction data to perform recovery of node A2 130 volumes on cluster B 160, for example, as part of a switchover.

At block 304, a switchover manager receives a request to perform a site switchover from the remote site to the local site. In an example, an administrator issues a switchover command on a node of cluster B 160 to perform a switchover from cluster A 110 to cluster B 160. A site switchover also may be scheduled or performed automatically in response to an event, such as a site outage. In one example, a switchover is performed from cluster A 110 to cluster B 160 after node A2 130 has failed and node A1 120 has taken over processing of node A2 130 volumes.

At block 306, a switchover manager receives a second copy of logged data associated with the disaster recovery partner of the remote site from a high availability partner at a local site in response to the switchover. In an example, the second copy of logged data received at block 306 usually is a different set of transaction data as compared to the first copy of logged data received at block 304. For example, the first copy of logged data generally may represent a set of logged transactions from a first period of time, while the second copy of logged data generally may represent a different set of logged transactions from a second period of time. Thus, the first copy of logged data and the second copy of logged data usually are not identical copies, and instead generally refer to different sets of logged transaction data.

In an example, switchover manager 102C receives logged transaction data from switchover manager 102A. In one example, the information provided by switchover manager 102A includes updates that node A1 120 has performed to its own volumes and to node A2 130 volumes that it has taken over since failure of node A1 120. In one example, switchover manager 102D of node B2 180 does not receive logged transaction data from switchover manager 102B after node A2 130 fails. Instead, switchover manager 102A sends logged transaction data for node A2 130 to switchover manager 102C.

In an example, switchover manager 102D receives logged transaction data associated with node A2 130 volumes for the first time after node A2 130 fails as part of a switchover. For example, replication of logged transaction data for a failed node may be deferred until switchover when a high-availability partner that takes over processing for the failed node replicates recovery data to its own disaster recovery partner. In one example, replication of logged transaction data associated with volumes of a failed node may be deferred until switchover to conserve bandwidth and reduce network operation costs.

In an example, switchover manager 102C receives logged transaction data from switchover manager 102A prior to a switchover. In response to the switchover, switchover manager 102C sends switchover manager 102D a copy of the logged transaction data from switchover manager 102A. In one example, switchover manager 102D stores the logged transaction data in an auxiliary, temporary, or working area partition of NVRAM 182 and uses the information when recovering volumes associated with failed node A2 130.

At block 308, a switchover manager determines whether to use the first copy of the logged data and the second copy of the logged data to recover remote storage volumes of the disaster recovery partner on local mirrored storage volumes. In an example, node B2 180 begins recovery of node A2 130 volumes during a switchover that is performed after the failure of node A2 130. In one example, a first copy of logged transaction data received from switchover manager 102B prior to failure of node A2 130 is stored in a partition of NVRAM 182. A second copy of logged transaction data comprising updates to node A2 130 volumes that occurred after the failure of node A2 130 (e.g., deferred disaster recovery data received from switchover manager 102C at block 306) are stored in a different partition of NVRAM 182.

In an example, switchover manager 102D determines whether to use the first copy of the logged transaction data by comparing consistency point information (e.g., a timestamp, sequence identifier, etc.) of the logged transaction data to consistency point information of one or more mirrored volumes in shared storage 190. Switchover manager 102D also compares consistency point information of the second copy of the logged transaction data to the mirrored volumes in shared storage 190.

In one example, switchover manager 102D determines that a copy of logged transaction data may be used for recovery when a consistency point of the logged transaction data comes after a consistency point of one or more volumes in shared storage 190. In another example, switchover manager 102D does not apply a copy of the logged transaction data when a consistency point of the logged transaction data precedes or is equal to the consistency point of one or more volumes in shared storage 190.

In an example, switchover manager 102D determines an ordering for the first copy of logged transaction data and the second copy of logged data. In one example, switchover manager 102D orders each copy of the logged transaction data by comparing consistency point information of each copy. For example, logged transaction data with an earlier consistency point (e.g., in sequence or time) should be applied to shared storage 190 volumes before transaction log data with a later consistency point as there may be dependencies in such data.

At block 310, the switchover manager validates the first copy of the logged data and the second copy of the logged data. In an example, switchover manager 102D performs validation of each copy of logged transaction data to confirm that each copy is free of corruption and may be used in recovering shared storage 190 volumes. In one example, switchover manager 102D validates each entry in each copy of logged transaction data. In one example, each copy of the logged transaction data is validated successfully, and switchover manager 102D recovers shared storage volumes 190 by applying updates from each copy of logged transaction data to shared storage 190 volumes in order.

In an example, switchover manager 102D validates the first ordered copy of logged transaction data successfully and detects an unrecoverable error (e.g., corruption) in the second ordered copy of logged transaction data. In one example, switchover manager 102D automatically proceeds with the recovery process and performs a partial recovery by applying the validated first ordered copy of the logged transaction data to shared storage 190 volumes. In one example, switchover manager 102D alerts an administrator of the unrecoverable error it detected in the second copy of the logged transaction data and provides the administrator with an option to proceed with partial recovery of shared storage 190 volumes.

In an example, switchover manager 102D detects an unrecoverable error in the first ordered copy of logged transaction data. For example, switchover manager 102D may detect corruption or another type of unrecoverable error in the first ordered copy of logged transaction data. In one example, switchover manager 102D stops the recovery process regardless of whether it validates the second ordered copy of logged transaction data, for example, because the second order copy depends on the first ordered copy and cannot be used in recovery without it. In one example, switchover manager 102D places one or more unrecoverable shared storage 190 volumes in a failed state and alerts an administrator when it cannot fully or partially recover the volumes.

At block 312, a switchover manager recovers the remote storage volumes of the disaster recovery partner using corresponding mirrored storage volumes at the local site. In an example, switchover manager 102D recovers one or more volumes of node A2 130 as part of a switchover. For example, switchover manager 102D may partially or fully recover volumes of node A2 130 that were taken over by node A1 120 after a failure of node A2 130.

In an example, switchover manager 102D uses logged transaction data generated by node A1 120 that it received from switchover manager 102C in response to the switchover to perform the recovery. In one example, the logged transaction data generated by node A1 120 comprises a combination of updates to volumes of node A1 120 and updates to volumes of node A2 130, which were processed by node A1 120.

In an example, switchover manager 102D identifies volumes of node A2 130 that it is to recover on cluster B 160 by examining one or more of cluster B 160 metadata, node B2 180 metadata, shared storage 190 metadata, and logged transaction data received from switchover manager 102B of node A2 130. Similarly, switchover manager 102C may identify node A1 120 volumes it is to recover on cluster B 160 using one or more of the same sources. In one example, a cross-cluster naming scheme is used to allow any switchover manager in either cluster to determine an original owner of a volume, for example, based on a predefined prefix or another identifier present in volume data or metadata.

In an example, switchover manager 102D recovers volumes of node A2 130 by applying updates from one or more copies of logged transaction data to mirrored shared storage 190 volumes on cluster B 160. In one example, switchover manager 102D identifies updates associated with volumes it is to restore by examining logged transaction for information specific to those volumes and ignoring updates to other volumes. Switchover manager 102D then applies the identified updates to shared storage 190 volumes to recover node A2 130 volumes on cluster B1 160. Switchover manager 102C may follow a similar process to identify and apply updates to restore volumes of node A1 120 on cluster B 160 as part of a switchover.

At block 314, a switchover manager resumes operations using the recovered storage volumes at the local site on completion of the switchover. In an example, switchover manager 102D completes partial or full recovery of shared storage 190 volumes associated with failed node A2 130 on cluster B1 160 as part of a requested switchover. Switchover manager 102C also completes recovery of shared storage 190 volumes associated with node A1 120 as part of the switchover. In one example, the switchover is completed, shared storage 190 is placed in an online state, and nodes B1 170 and B2 180 resume client processing on cluster B 160.

Figure 4:
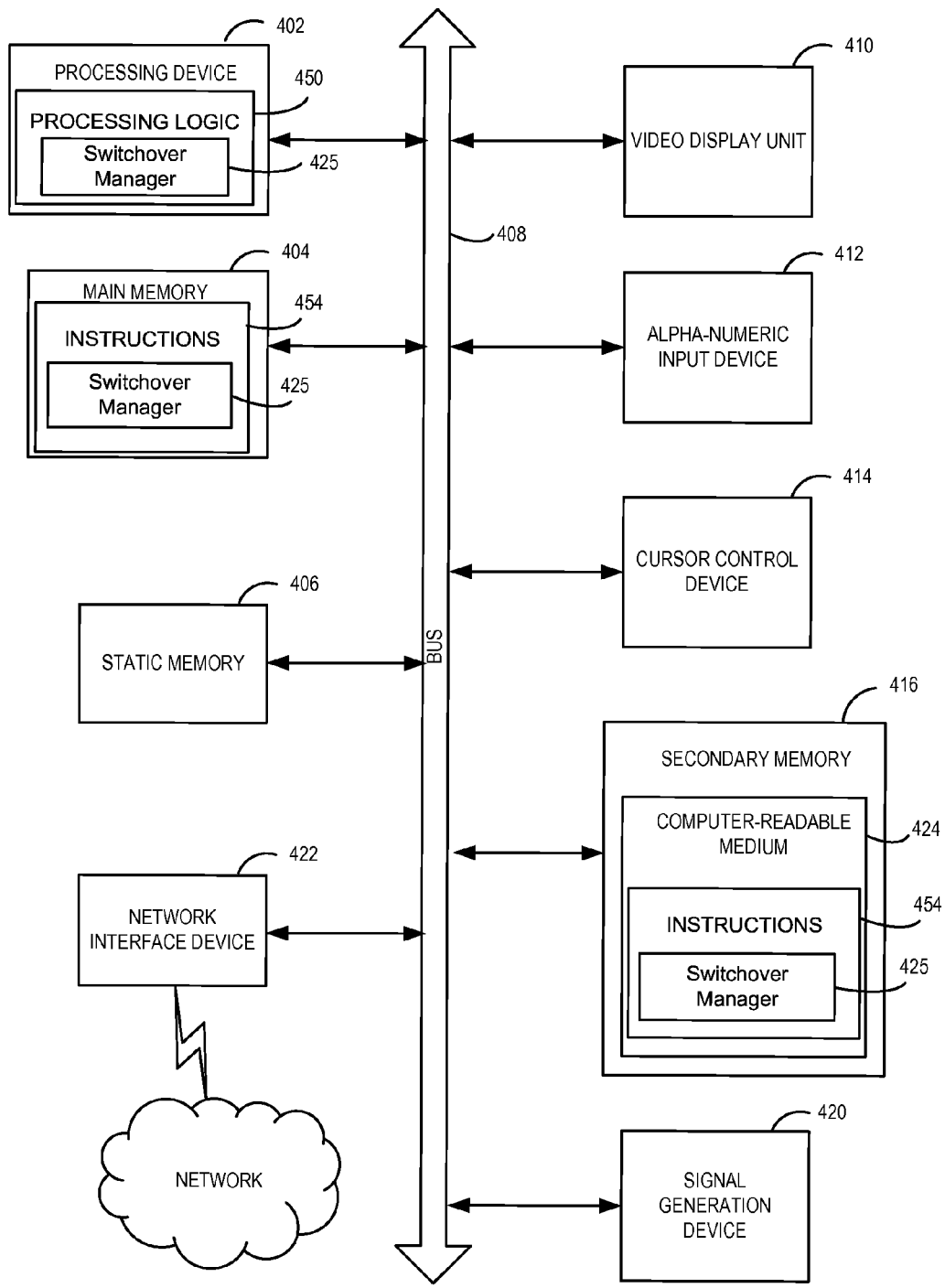
FIG. 4 illustrates a diagrammatic representation of a machine in the example form of a computer system.

FIG. 4 illustrates a diagrammatic representation of a machine in the exemplary form of a computer system 400 within which a set of instructions, for causing the machine to perform any one or more of the methodologies discussed herein, may be executed. In an example, computer system 400 may correspond to a node (e.g., node A1 120, node A2, 130, node B1 170, or node B2 180) in system architecture 100 of FIG. 1.

In examples of the present disclosure, the machine may be connected (e.g., networked) to other machines via a Local Area Network (LAN), a metropolitan area network (MAN), a wide area network (WAN)), a fibre channel connection, an inter-switch link, an intranet, an extranet, the Internet, or any combination thereof. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a storage controller, a network router, a switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 416 (e.g., a data storage device), which communicate with each other via a bus 408.

The processing device 402 represents one or more general-purpose processing devices such as a microprocessor, central processing unit, or the like. The processing device may include multiple processors. The processing device 402 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

In an example involving a storage controller, a video display unit 410, an alphanumeric input device 412, and a cursor control device 414 are not part of the storage controller. Instead, an application running on a client or server interfaces with a storage controller, and a user employs a video display unit 410, an alphanumeric input device 412, and a cursor control device 414 at the client or server.

The secondary memory 416 may include a machine-readable storage medium (or more specifically a computer-readable storage medium) 424 on which is stored one or more sets of instructions 454 embodying any one or more of the methodologies or functions described herein (e.g., switchover manager 425). The instructions 454 may also reside, completely or at least partially, within the main memory 404 and/or within the processing device 402 during execution thereof by the computer system 400 (where the main memory 404 and the processing device 402 constitute machine-readable storage media).

While the computer-readable storage medium 424 is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine that cause the machine to perform any one or more of the operations or methodologies of the present disclosure. The term "computer-readable storage medium" shall accordingly be taken to include, but not be limited to, solid-state memories, and optical and magnetic media.

The computer system 400 additionally may include a switchover manager module (not shown) for implementing the functionalities of a switchover manager (e.g., switchover manager 102A, switchover manager 102B, switchover manager 102C, or switchover manager 102D of FIG. 1). The modules, components and other features described herein (for example, in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices have been shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "updating", "determining", "storing", "computing", "comparing", "initializing", "returning", "providing," "analyzing," "notifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples and implementations will be apparent to those of skill in the art upon reading and understanding the above description. The scope of the disclosure should therefore be determined with reference to the appended claims, along with the full scope of equivalents to which such claims are entitled.

What is claimed is:

1. A computer-implemented method, comprising:
    receiving, by a first node at a local site, a first copy of logged data from a second node at a remote site, the first copy of logged data corresponding to one or more storage volumes associated with the second node at the remote site;
    receiving, at the local site, a request to perform a switchover from the remote site to the local site;
    receiving, by the first node, a second copy of logged data from a third node at the local site in response to the switchover, the second copy of logged data corresponding to the storage volumes associated with the second node at the remote site; and
    recovering, by the first node, the storage volumes associated with the second node using one or more corresponding mirrored storage volumes at the local site.

2. The method of claim 1, further comprising:
    storing, by the first node, the first copy of logged data in a non-volatile memory partition on the first node; and
    storing, by the first node, the second copy of logged data in a different non-volatile memory partition on the first node.

3. The method of claim 2, wherein the first node comprises:
    a first non-volatile memory partition to store logged data from the first node at the local site;

a second non-volatile memory partition to store logged data from the second node at the remote site;
a third non-volatile memory partition to store logged data from the third node at the local site; and
a fourth non-volatile memory partition to store logged data from a high-availability partner of the second node at the remote site.

4. The method of claim 1, further comprising:
determining, by the first node, an ordering for the first copy of the logged data and the second copy of the logged data.

5. The method of claim 4, wherein the ordering is determined based on comparing consistency point information of the first copy of the logged data with consistency point information of the second copy of the logged data.

6. The method of claim 1, further comprising:
determining, by the first node, whether to apply each of the first copy of the logged data and the second copy of the logged data to the mirrored storage volumes.

7. The method of claim 1, wherein the recovering comprises:
updating, by the first node, the mirrored volumes using one of the copies of logged data.

8. The method of claim 1, wherein the recovering comprises:
updating, by the first node, the mirrored volumes using both the first copy of the logged data and the second copy of logged data in a determined order.

9. The method of claim 1, further comprising:
validating, by the first node, the first copy of the logged data; and
validating, by the first node, the second copy of the logged data.

10. The method of claim 1, further comprising:
detecting, by the first node, an unrecoverable error in at least one of the copies of logged data.

11. The method of claim 10, wherein the mirrored volumes are partially recovered using an earlier ordered copy of the logged data when an unrecoverable error is detected in a later ordered copy of the logged data.

12. The method of claim 1, further comprising:
resuming, by the first node, operations on the recovered storage volumes at the local site on completion of the switchover.

13. The method of claim 1, wherein the first node and the second node are disaster recovery partners each situated at different geographic locations.

14. The method of claim 1, wherein the first node and the third node are high availability partners situated at the local site.

15. The method of claim 1, wherein the third node at the local site receives the second copy of the logged data from a fourth node at the remote site prior to the switchover.

16. The method of claim 1, wherein the request to perform the switchover is received by a node at the local site.

17. The method of claim 1, wherein the copies of logged data each comprise one or more updates that occurred on a node at the remote site prior to the switchover.

18. The method of claim 1, wherein the method is performed by a storage server.

19. A computer-readable medium having instructions recorded thereon, that when executed by a processor, cause the processor to perform operations, comprising:
at a first computer node, mirroring logged data for storage volumes from a High-Availability (HA) partner node and a Disaster Recovery (DR) partner node at a remote cluster;
receiving a command to perform a switchover; and
in response to the command, recovering one of the storage volumes that correspond to the DR partner node;
wherein recovering one of the storage volumes includes:
copying logged data from the HA partner node, where the logged data corresponds to the DR partner node, changing ownership of the one of the storage volumes from the DR partner node to the first computer node, and flushing the copied logged data from the HA partner node to a storage aggregate implementing the one of the storage volumes at the first computer node.

20. A system, comprising:
a memory; and
a processor coupled to the memory to:
receive, by a first node at a local site, a first copy of logged data from a second node at a remote site, the first copy of logged data corresponding to one or more storage volumes associated with the second node at the remote site;
receive, by the first node, a request to perform a switchover from the remote site to the local site;
receive, by the first node, a second copy of logged data from a third node at the local site in response to the switchover, the second copy of logged data corresponding to the storage volumes associated with the second node at the remote site; and
recover, by the first node, the storage volumes associated with the second node using one or more corresponding mirrored storage volumes at the local site.

* * * * *